(12) United States Patent
Nordbruch et al.

(10) Patent No.: US 12,307,833 B2
(45) Date of Patent: May 20, 2025

(54) METHOD FOR TESTING A SENSOR SYSTEM OF A MOTOR VEHICLE

(71) Applicant: Robert Bosch GmbH, Stuttgart (DE)

(72) Inventors: Stefan Nordbruch, Leonberg (DE); Rolf Nicodemus, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 862 days.

(21) Appl. No.: 17/446,339

(22) Filed: Aug. 30, 2021

(65) Prior Publication Data
US 2022/0084334 A1 Mar. 17, 2022

(30) Foreign Application Priority Data
Sep. 14, 2020 (DE) .......................... 102020211483.8

(51) Int. Cl.
*G01D 18/00* (2006.01)
*G06V 20/40* (2022.01)
*G06V 20/56* (2022.01)
*G07C 5/08* (2006.01)
*H04N 17/00* (2006.01)

(52) U.S. Cl.
CPC ............ *G07C 5/0808* (2013.01); *G06V 20/41* (2022.01); *G06V 20/56* (2022.01); *H04N 17/002* (2013.01)

(58) Field of Classification Search
CPC ...... G07C 5/0808; G06V 20/41; G06V 20/56; G06V 20/52; H04N 17/002; G01M 17/007; G01D 18/00; G01S 7/41; G01S 7/497
See application file for complete search history.

(56) References Cited

U.S. PATENT DOCUMENTS 11,460,855 B1 * 10/2022 Lim .................... G05D 1/024
2003/0028291 A1 * 2/2003 Matsuura ............ G06V 20/58
356/3

(Continued)

FOREIGN PATENT DOCUMENTS

DE 102017130623 A1 6/2018
DE 102017220528 A1 * 5/2019

(Continued)

OTHER PUBLICATIONS

Zhang and Pless: "Extrinsic Calibration of a Camera and Laser Range Finder (improves camera calibration)", Proceedings of the IWWW/RSJ International Conference on Intelligent Robots and Systems, Jan. 2004 (DOI: 10.1109/IROS.2004.1389752), pp. 1-6.

*Primary Examiner* — Daniel M. Robert
(74) *Attorney, Agent, or Firm* — NORTON ROSE FULBRIGHT US LLP

(57) ABSTRACT

A method for testing a sensor system of a motor vehicle, the sensor system including a surroundings sensor which is configured to acquire surroundings of the motor vehicle. The method includes: receiving reference object signals which represent a reference object detected with the aid of a motor vehicle-external surroundings sensor in the surroundings of the motor vehicle, receiving object signals which represent an object detected with the aid of the surroundings sensor in the surroundings of the motor vehicle, and comparing the object to the reference object to test the sensor system. A device, a computer program, and a machine-readable storage medium, are also described.

10 Claims, 2 Drawing Sheets

(56) References Cited

U.S. PATENT DOCUMENTS

| | | | | |
|---|---|---|---|---|
| 2006/0290920 | A1* | 12/2006 | Kampchen | G01S 7/4972 |
| | | | | 356/139.07 |
| 2014/0350852 | A1* | 11/2014 | Nordbruch | G06V 30/2504 |
| | | | | 701/523 |
| 2015/0269790 | A1* | 9/2015 | Batcheller | B60K 35/22 |
| | | | | 701/537 |
| 2016/0239442 | A1* | 8/2016 | Chun | G06F 13/18 |
| 2018/0050704 | A1* | 2/2018 | Tascione | G07C 5/0808 |
| 2019/0204425 | A1* | 7/2019 | Abari | G01S 7/497 |
| 2020/0096606 | A1 | 3/2020 | Okubo et al. | |
| 2020/0150235 | A1* | 5/2020 | Beijbom | G06N 3/08 |
| 2021/0239813 | A1* | 8/2021 | Sergeev | G01S 7/4972 |
| 2022/0084334 | A1* | 3/2022 | Nordbruch | G01M 17/007 |
| 2022/0164578 | A1* | 5/2022 | Deng | G06T 7/73 |
| 2023/0391351 | A1* | 12/2023 | Hashimoto | G06V 20/588 |

FOREIGN PATENT DOCUMENTS

| | | | | |
|---|---|---|---|---|
| DE | 102018205444 A1 | * | 10/2019 | G01S 13/931 |
| JP | 6973351 B2 | * | 11/2021 | |
| WO | 2016179798 A1 | | 11/2016 | |

* cited by examiner

METHOD FOR TESTING A SENSOR SYSTEM OF A MOTOR VEHICLE

CROSS REFERENCE

The present application claims the benefit under 35 U.S.C. § 119 of German Patent Application No. DE 102020211483.8 filed on Sep. 14, 2020, which is expressly incorporated herein by reference in its entirety.

FIELD

The present invention relates to a method for testing a sensor system of a motor vehicle. The present invention furthermore relates to a device, a computer program, and a machine-readable storage medium.

BACKGROUND INFORMATION

German Patent Application No. DE 10 2017 130 623 A1 describes a vehicle sensor training system.

SUMMARY

An object of the present invention is to provide for efficient testing of a sensor system of a motor vehicle, the sensor system including a surroundings sensor which is designed to acquire surroundings of the motor vehicle.

This object is achieved with the aid of the example embodiments of the present invention. Advantageous embodiments of the present invention are disclosed herein.

According to a first aspect of the present invention, a method for testing a sensor system of a motor vehicle is provided, the sensor system including a surroundings sensor which is designed to acquire surroundings of the motor vehicle. In accordance with an example embodiment of the present invention, the method includes the following steps:
  receiving reference object signals which represent a reference object detected with the aid of a motor vehicle-external-surroundings sensor in the surroundings of the motor vehicle,
  receiving object signals which represent an object detected with the aid of the surroundings sensor in the surroundings of the motor vehicle,
  comparing the object to the reference object to test the sensor system.

According to a second aspect of the present invention, an apparatus is provided which is configured to carry out all steps of the method according to the first aspect.

According to a third aspect of the present invention, a computer program is provided which includes commands which, when the computer program is executed by a computer, for example, by the device according to the second aspect, cause it to carry out a method according to the first aspect.

According to a fourth aspect of the present invention, a machine-readable storage medium is provided on which the computer program according to the third aspect is stored.

The present invention is based on and includes the finding that the above objective may be achieved in that an object in the surroundings of the motor vehicle, which is acquired with the aid of a motor vehicle-external surroundings sensor, is used as the reference object for testing the sensor system. This effectuates the technical advantage, for example, that a reference object may be provided efficiently for testing the sensor system.

The technical advantage is thus effectuated in particular that the sensor system may be tested efficiently. Thus, for example, a hardware and/or software error in the sensor system may advantageously be recognized efficiently.

According to one specific embodiment of the present invention, it is provided that the method according to the first aspect includes a step of testing the sensor system based on the comparison of the object to the reference object.

According to one specific embodiment of the present invention, it is provided that the motor vehicle-external surroundings sensor is an infrastructure surroundings sensor. An infrastructure surroundings sensor refers to a motor vehicle-external surroundings sensor which is situated inside infrastructure within which the motor vehicle is located.

In this case, the technical advantage is thus effectuated in particular that the infrastructure may specify the reference object. The infrastructure thus more or less represents a reference. This is possible in particular since the infrastructure knows its surroundings, in which, for example, objects familiar to the infrastructure are situated.

Furthermore, the infrastructure may advantageously efficiently check itself—this is in contrast to the motor vehicle, which moves or is located in an open world scenario.

Furthermore, the infrastructure may also efficiently recognize changes in its surroundings—this is in contrast to a motor vehicle-external sensor calibration based on a digital map. Such a calibration is based, for example, on the motor vehicle recognizing known objects, which are specified by the digital map, for example, in the world and may check or calibrate itself thereon. The problem here, however, is that such objects may change over time. For example, such objects may change due to destruction, storm, or vandalism or simply by wear over time. In such a case, the motor vehicle itself may not ascertain or may not ascertain to a sufficient extent whether the motor vehicle surroundings sensor still functions correctly. One consequence may be that, for example, an automated driving function has to be switched off. That is to say, an availability of such an automated driving function thus decreases.

In contrast, the infrastructure may efficiently recognize a change in its surroundings, so that a reliable reference object may thus be provided for testing the sensor system of the motor vehicle.

Furthermore, the infrastructure may carry out, for example, a self-check of its infrastructure surroundings sensor. In particular if multiple surroundings sensors are situated spatially distributed within the infrastructure, a plurality of redundant and diverse surroundings sensors is available for such a self-check.

Furthermore, the use of the infrastructure for providing a reference object has the technical advantage that it may be maintained and checked regularly, so that the infrastructure thus functions reliably and may provide a reliable reference object.

The infrastructure may thus be considered to be statistically more reliable than the motor vehicle.

Example embodiments of the present invention are thus based in particular, among other things, on a particular object, which is acquired or detected with the aid of the infrastructure and with the aid of the motor vehicle, is jointly compared and in particular analyzed.

In one specific embodiment of the present invention, multiple motor vehicle-external surroundings sensors are provided.

This means in particular that according to one specific embodiment, multiple infrastructure surroundings sensors are provided.

Statements which are made in conjunction with a motor vehicle-external surroundings sensor apply similarly to multiple motor vehicle-external surroundings sensors and vice versa.

According to one specific embodiment of the present invention, a reference object is a static reference object or a reference object is a dynamic reference object.

In the case of a static reference object, it may be provided according to one specific embodiment that there is a distinction between a presently, thus instantaneously, stationary object, for example a stationary motor vehicle, and an object present in the surroundings which is always stationary or nonmoving, thus immobile, for example a streetlight.

This means in particular that, according to one specific embodiment of the present invention, a static reference object may be a mobile object or an immobile object.

An immobile object is, for example, an infrastructure element of the infrastructure.

An infrastructure is, according to one specific embodiment of the present invention, one of the following infrastructure elements: streetlight, traffic signal system, road sign, building.

A dynamic reference object or a mobile reference object is, for example, one of the following objects: motor vehicle, bicycle, person, or animal.

A surroundings sensor in the meaning of the description is, for example, one of the following surroundings sensors: radar sensor, LIDAR sensor, ultrasonic sensor, magnetic field sensor, infrared sensor, or video sensor.

The sensor of the surroundings sensor system may be referred to, for example, as a motor vehicle surroundings sensor or as a motor vehicle-internal surroundings sensor.

According to one specific embodiment of the present invention, the sensor system includes a data processing unit, which is configured to process surroundings sensor data corresponding to the acquisition of the surroundings of the motor vehicle with the aid of the surroundings sensor, in order to detect and in particular to classify an object in the surroundings of the motor vehicle.

The testing of the sensor system includes, according to one specific embodiment, testing of the surroundings sensor and/or testing of the data processing unit.

According to one specific embodiment of the present invention, it is provided that the reference object is described by at least one reference object parameter and the object is described by at least one object parameter, the comparison of the object to the reference object including a comparison of the at least one reference object parameter to the at least one object parameter.

The technical advantage is thus effectuated, for example, that the reference object and the object may be efficiently described, so that the comparison of the object to the reference object may be carried out efficiently.

According to one specific embodiment of the present invention, it is provided that the at least one reference object parameter and the at least one object parameter are each an element selected from the following group of parameters: position, dimension, color, surface condition, velocity, acceleration, classification.

A technical advantage is thus effectuated, for example, that particularly suitable reference object parameters and particularly suitable object parameters may be used.

According to one specific embodiment of the present invention, it is provided that reference time stamp signals are received which represent a reference time stamp which indicates a detection time of the reference object, time stamp signals being received which represent a time stamp which indicates a detection time of the object, the comparison of the object to the reference object including a comparison of the time stamp to the reference time stamp.

A technical advantage is thus effectuated, for example, that it is possible to distinguish efficiently between a static and a dynamic reference object or object.

According to one specific embodiment of the present invention, it is provided that control signals for the at least semi-automated control of a lateral and/or longitudinal guidance of the motor vehicle are generated based on the comparison of the object to the reference object, the generated control signals being output.

A technical advantage is thus effectuated, for example, that the motor vehicle may be guided efficiently at least in a semi-automated manner.

The formulation "at least semi-automated guidance" includes one or multiple of the following cases: assisted guidance, semi-automated guidance, highly automated guidance, fully automated guidance.

Assisted guidance means that a driver of the motor vehicle continuously carries out either the lateral or the longitudinal guidance of the motor vehicle. The particular other driving task (thus a control of the longitudinal or the lateral guidance of the motor vehicle) is carried out automatically. This thus means that during assisted guidance of the motor vehicle, either the lateral or the longitudinal guidance is automatically controlled.

Semi-automated guidance means that in a specific situation (for example: driving on a freeway, driving within a parking area, overtaking an object, driving within a lane which is defined by lane markings) and/or for a certain period of time, a longitudinal and/or a lateral guidance of the motor vehicle is automatically controlled. A driver of the motor vehicle does not himself have to manually control the longitudinal and lateral guidance of the motor vehicle. However, the driver does have to continuously monitor the automatic control of the longitudinal and lateral guidance to be able to intervene manually if needed. The driver has to be ready at any time to completely take over the motor vehicle guidance.

Highly automated guidance means that for a certain period of time in a specific situation (for example: driving on a freeway, driving within a parking area, overtaking an object, driving within a lane which is defined by lane markings) a longitudinal and a lateral guidance of the motor vehicle are automatically controlled. A driver of the motor vehicle does not himself have to manually control the longitudinal and lateral guidance of the motor vehicle. The driver does not have to continuously monitor the automatic control of the longitudinal and lateral guidance to be able to intervene manually if needed. If needed, a takeover request is output automatically to the driver to take over the control of the longitudinal and lateral guidance, in particular output with a sufficient time reserve. The driver thus potentially has to be capable of taking over the control of the longitudinal and lateral guidance. Limits of the automatic control of the lateral and longitudinal guidance are automatically recognized. In highly automated guidance, it is not possible to bring about a minimal-risk state automatically in every starting situation.

Fully automated guidance means that in a specific situation (for example: driving on a freeway, driving within a parking area, overtaking an object, driving within a lane which is defined by lane markings) a longitudinal and a lateral guidance of the motor vehicle are automatically controlled. A driver of the motor vehicle does not himself have to manually control the longitudinal and lateral guidance of the motor vehicle. The driver does not have to monitor the automatic control of the longitudinal and lateral guidance to be able to intervene manually if needed. Before ending the automatic control of the lateral and longitudinal guidance, a request is automatically made to the driver to take over the driving task (control the lateral and longitudinal guidance of the motor vehicle), in particular with a sufficient time reserve. If the driver does not take over the driving task, it returns automatically into a minimal-risk state. Limits of the automatic control of the lateral and longitudinal guidance are automatically recognized. In all situations, it is possible to return automatically into a minimal-risk system state.

According to one specific embodiment of the present invention, it is provided that after both the reference object signals and also the object signals have been received, a point in time for the comparison of the object to the reference object is ascertained based on a processing capacity available for the step of comparison, the step of comparing the object to the reference object being carried out at the ascertained point in time.

A technical advantage is thus effectuated, for example, that the comparison of the object to the reference object is first carried out when sufficient processing capacities are available for this comparison. The technical advantage is thus effectuated in particular that the step of comparing may be carried out efficiently. Furthermore, the technical advantage is thus effectuated that other tasks in the motor vehicle which have, for example, a higher priority than the step of comparing may still be carried out efficiently. Thus, for example, the actual driving task of the motor vehicle may still be carried out using sufficient processing capacities.

In one specific embodiment of the present invention, it is provided that one or multiple method steps are executed internally in the motor vehicle and/or externally to the motor vehicle in an infrastructure, for example in a cloud infrastructure.

A technical advantage is thus effectuated, for example, that the individual method steps may be carried out efficiently.

In one specific embodiment of the present invention, it is provided that one or multiple method steps are documented, in particular documented in a block chain.

A technical advantage is thus effectuated, for example, that even after the method is carried out or executed, it may be analyzed later on the basis of the documentation. The documentation in a block chain in particular has the technical advantage that the documentation is secure from tampering and falsification.

A block chain is in particular a continuously expandable list of data sets, called "blocks," which are linked to one another with the aid of one or multiple cryptographic methods. Each block contains in particular a cryptographically secure hash (scattering value) of the preceding block, in particular a time stamp and in particular transaction data.

According to one specific embodiment of the present invention, it is provided that the reference object signals are included by a unicast communication message intended for the motor vehicle or by a broadcast communication message.

A technical advantage is thus effectuated, for example, that the reference objects may be provided efficiently to the motor vehicle.

According to one specific embodiment of the present invention, it is provided that the method according to the first aspect is a computer-implemented method.

According to one specific embodiment of the present invention, it is provided that the method according to the first aspect is executed or carried out with the aid of the device according to the second aspect.

Device features result similarly from corresponding method features and vice versa. This thus means in particular that technical functionalities of the device according to the second aspect result similarly from corresponding technical functionalities of the method according to the first aspect and vice versa.

The formulation "at least one" stands in particular for "one or multiple."

According to one specific embodiment of the present invention, the method according to the first aspect includes detecting the reference object with the aid of the motor vehicle-external surroundings sensor.

According to one specific embodiment of the present invention, the method according to the first aspect includes detecting the object with the aid of the surroundings sensor of the sensor system.

According to one specific embodiment of the present invention, it is provided that the entire system including the motor vehicle and the infrastructure, in particular including the communication between motor vehicle and infrastructure, is secure. This means that, for example, the motor vehicle and the infrastructure may trust one another that the correspondingly transmitted data, thus the detected object or the detected reference object, were not changed, for example, by hackers. This is ensured, for example, by certificates.

This thus means in particular that the reference object signals and/or the object signals may be digitally signed. For example, they are signed with the aid of a digital certificate and/or digital key.

This also applies similarly to the reference time stamp and/or the time stamp.

According to one specific embodiment of the present invention, it is provided that when the step of comparing the object to the reference object has the result that the object corresponds to the reference object within a predetermined correspondence measure, it is determined that the sensor system functions correctly.

However, if the object does not correspond to the reference object, for example, within the predetermined correspondence measure, it is determined, for example, that the sensor system does not function correctly.

This thus means in particular that in the comparison, it is presumed, for example, that there may be a defined and settable deviation due to reliable measuring inaccuracies.

However, if the object does not correspond to the reference object within the permissible deviation, it may thus be presumed that the sensor system no longer functions correctly.

In such a case, it may be provided, for example, that an at least semi-automated driving function which uses the sensor system is restricted and/or stopped, in particular partially.

If a deviation of the object from the reference object is still within a predetermined tolerance measure, it may be provided, for example, that an at least semi-automated driving function which uses the sensor system continues to still be operated in a restricted mode, in particular until the motor vehicle has also been guided into a safe state. A safe state is, for example, parking or a stopped motor vehicle.

A restricted mode means, for example, that in such a mode, the motor vehicle may be guided at a lower maximum motor vehicle velocity than in the nonrestricted mode.

Exemplary embodiments of the present invention are illustrated in the figures and explained in greater detail in the following description.

DETAILED DESCRIPTION OF EXAMPLE EMBODIMENTS

Figure 1:
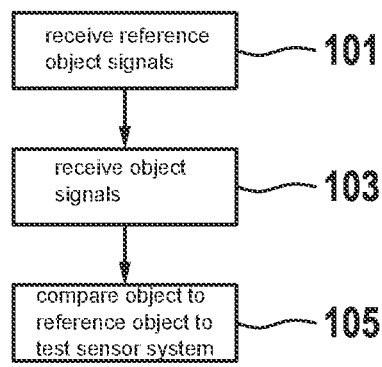
FIG. 1 shows a flowchart of a method for testing a sensor system of a motor vehicle, in accordance with an example embodiment of the present invention.

FIG. 1 shows a flowchart of a method for testing a sensor system of a motor vehicle, the sensor system including a surroundings sensor which is designed to acquire surroundings of the motor vehicle, including the following steps:

receiving 101 reference object signals which represent a reference object detected with the aid of a motor vehicle-external surroundings sensor in the surroundings of the motor vehicle, receiving 103 object signals, which represent an object detected with the aid of the surroundings sensor in the surroundings of the motor vehicle, comparing 105 the object to the reference object in order to test the sensor system.

In one specific embodiment, step 101 is executed before step 103 or vice versa. In one specific embodiment, steps 101 and 103 are executed at the same time.

According to one specific embodiment, it is provided that calibration data for calibrating the sensor system are ascertained based on the comparison of the object to the reference object.

A calibration of the sensor system includes, according to one specific embodiment, a calibration of the surroundings sensor.

According to one specific embodiment, the method according to the first aspect includes calibrating the surroundings sensor based on the calibration data.

According to one specific embodiment, it is provided that the method according to the first aspect includes ascertaining a test result based on the testing of the sensor system based on the comparison of the object to the reference object.

The test result indicates, according to one specific embodiment, whether the sensor system has a hardware error and/or a software error.

A hardware error may be, for example, a surroundings sensor which is no longer correctly positioned.

Figure 2:
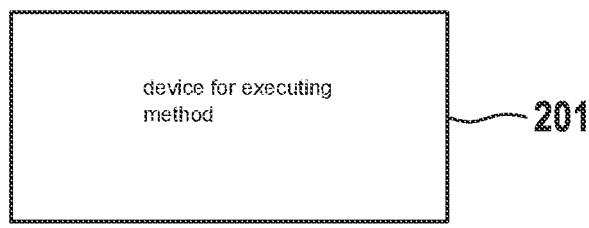
FIG. 2 shows a device in accordance with an example embodiment of the present invention.

FIG. 2 shows a device 201.

Device 201 is designed to execute all steps of the method according to the first aspect.

According to one specific embodiment, device 201 includes an input which is designed to receive the reference object signals and the object signals.

The input is designed, according to one specific embodiment, to receive the reference time stamp signals and to receive the time stamp signals.

According to one specific embodiment, device 201 includes a processor which is designed to compare the object to the reference object in order to test the sensor system.

The processor is designed, for example, to test the sensor system based on the comparison of the object to the reference object.

The processor is designed, according to one specific embodiment, to calibrate the sensor system based on the testing of the sensor system.

The processor is thus designed, according to one specific embodiment, to calibrate the sensor system based on the test result.

The processor is thus designed, according to one specific embodiment, to ascertain calibration data based on the test result.

Figure 3:
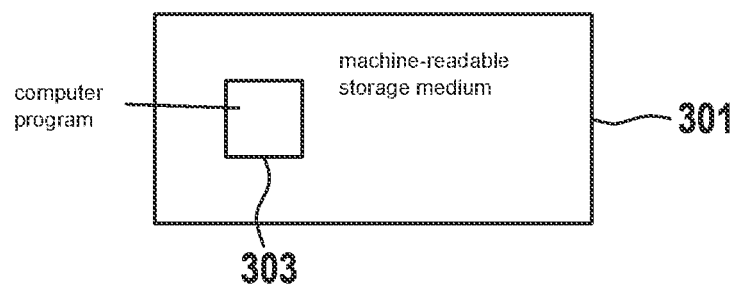
FIG. 3 shows a machine-readable storage medium in accordance with an example embodiment of the present invention.

FIG. 3 shows a machine-readable storage medium 301.

A computer program 303 is stored on machine-readable storage medium 301. Computer program 303 includes commands which, when computer program 303 is executed by a computer, cause this computer to carry out a method according to the first aspect.

Figure 4:
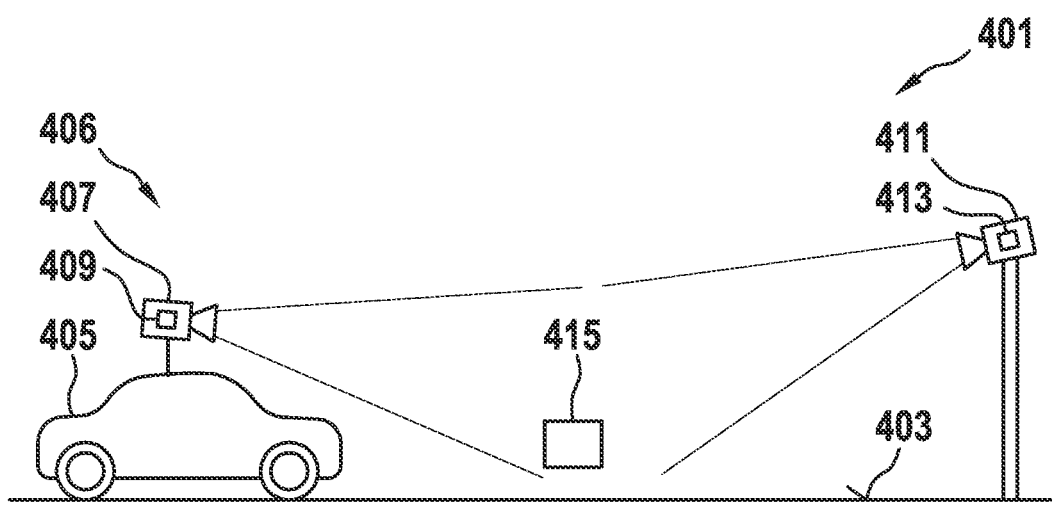
FIG. 4 shows an infrastructure, in accordance with an example embodiment of the present invention.

FIG. 4 shows an infrastructure 401. Infrastructure 401 includes a road 403 on which a motor vehicle 405 travels.

Motor vehicle 405 includes a sensor system 406. Sensor system 406 includes a video sensor 409 of a video camera 407.

Video camera 407 is situated on the roof of motor vehicle 405.

A further video camera 411 including a further video sensor 413 is located inside infrastructure 401.

An object 415 is located inside infrastructure 401.

Further video camera 411 detects object 415 with the aid of further video sensor 413.

Furthermore, video sensor 409 of video camera 407 of sensor system 406 of motor vehicle 405 detects object 415.

On the one hand, object 415 is thus detected on the motor vehicle side.

On the other hand, object 415 is detected on the infrastructure side.

The detection of object 415 on the part of the infrastructure represents the reference for testing sensor system 406. This thus means that object 415 detected on the infrastructure side represents a reference object.

The object detected on the motor vehicle side is thus compared to the reference object in order to test the sensor system.

In one specific embodiment (not shown), sensor system 406 of motor vehicle 405 includes, in each case alternatively or additionally to video camera 407, one or more surroundings sensors. Such a surroundings sensor is, for example, one of the following surroundings sensors: radar sensor, LIDAR sensor, ultrasonic sensor, magnetic field sensor, infrared sensor, or video sensor.

In one specific embodiment (not shown), one or multiple surroundings sensors are each provided alternatively or additionally to further video camera 411, which are in particular situated spatially distributed inside infrastructure 401. Such a surroundings sensor is, for example, one of the following surroundings sensors: radar sensor, LIDAR sensor, ultrasonic sensor, magnetic field sensor, infrared sensor, or video sensor.

In one specific embodiment, the motor vehicle requests one or multiple reference objects from the infrastructure upon approach to the infrastructure, the approach being able to be ascertained, for example, from a digital map.

The infrastructure transmits, in one specific embodiment, thereafter in response to such a request reference object signals corresponding to the reference object or objects to the querying motor vehicle.

According to one specific embodiment, the infrastructure transmits one or multiple of the following data to the motor vehicle in addition to the reference object signals:

Time specification, position specification, dimension specification, color specification, surface specification (for example, edges), velocity/acceleration specifications, classifications, for example, human, automobile, motorcycle.

In one specific embodiment, the infrastructure transmits reference object signals to all motor vehicles within the infrastructure upon a request, in particular an arbitrary request. This thus means that the infrastructure emits broadcast communication messages which include the reference object signals.

According to one specific embodiment, the infrastructure regularly transmits, in particular unasked, reference object signals to all vehicles.

In one specific embodiment, the motor vehicle transmits the object signals to the infrastructure.

In one specific embodiment, both the motor vehicle and also the infrastructure transmit the reference object signals and/or the object signals, so that the step of comparing may be carried out both internally in the motor vehicle and also on the part of the infrastructure.

According to one specific embodiment, the object is compared to the reference object, in particular in the motor vehicle, inside the infrastructure and/or both in the motor vehicle and also in the infrastructure.

In one specific embodiment, the surroundings sensor of the sensor system is calibrated based on a result of the comparison of the object to the reference object.

According to one specific embodiment, the calibration is carried out based on calibration data.

According to one specific embodiment, the calibration data are ascertained based on a test result.

According to one specific embodiment, the calibration data are ascertained internally in the motor vehicle or on the part of the infrastructure or both internally in the motor vehicle and also on the part of the infrastructure.

According to one specific embodiment, it is provided that the calibration data ascertained internally in the motor vehicle are compared to the calibration data ascertained on the part of the infrastructure.

According to one specific embodiment, a result of the calibration is checked based on the calibration data, in particular using an internal check program.

In one specific embodiment, the sensor system is checked again, for example, based on a further object and a further reference object.

According to one specific embodiment, one or multiple method steps is/are carried out in the motor vehicle and/or in the infrastructure.

According to one specific embodiment, it is provided that action instruction signals are ascertained based on a test result of the testing of the sensor system, the action instruction signals representing one action instruction or multiple action instructions.

One action instruction includes, for example, continuing to drive, since everything is OK.

One action instruction includes, for example, initiating a safe state because an error has occurred.

According to one specific embodiment, the step of comparing and/or the step of testing the sensor system and/or the step of calibrating the surroundings sensor is carried out off-line, for example, or is carried out with a delay, thus after a certain time. One reason for this may be, for example, that at the time, for example, processing capacities are required for the actual driving task. This means that online processing could possibly have resulted in impairments of the driving task.

According to one specific embodiment, the individual method steps, in particular with the ascertained data, or at least important parts thereof, are documented, in particular documented in a falsification-proof manner, for example, with the aid of a block chain.

In one specific embodiment, the data or results are analyzed and in particular passed on to one or multiple different interest groups, in particular anonymously. Such interest groups include, for example, an OEM, the ADAC (Allgemeiner Deutscher Automobil Club—General German Automobile Club—), or a supplier of components of the motor vehicle, for example, surroundings sensors.

According to one specific embodiment, it is provided that the entire system including the motor vehicle and the infrastructure, in particular including the communication between motor vehicle and infrastructure, is secure. This means that, for example, the motor vehicle and the infrastructure may trust one another that the correspondingly transmitted data, thus the detected object or the detected reference object, were not altered, for example, by hackers. This is ensured, for example, by certificates.

This thus means in particular that the reference object signals and/or the object signals may be digitally signed. For example, they are signed with the aid of a digital certificate and/or digital key.

This also applies similarly to the reference time stamp and/or the time stamp.

According to one specific embodiment, it is provided that when the step of comparing the object to the reference object has the result that the object corresponds to the reference object within a predetermined correspondence measure, it is determined that the sensor system functions correctly.

However, if the object does not correspond to the reference object, for example, within the predetermined correspondence measure, it is determined, for example, that the sensor system does not function correctly.

This thus means in particular that in the comparison, it is presumed, for example, that there may be a defined and settable deviation due to reliable measuring inaccuracies.

However, if the object does not correspond to the reference object within the permissible deviation, it may thus be presumed that the sensor system no longer functions correctly.

In such a case, it may be provided, for example, that an at least semi-automated driving function which uses the sensor system is restricted and/or stopped, in particular partially.

If a deviation of the object from the reference object is still within a predetermined tolerance measure, it may be provided, for example, that an at least semi-automated driving function which uses the sensor system continues to still be operated in a restricted mode, in particular until the motor vehicle has also been guided into a safe state. A safe state is, for example, parking or a stopped motor vehicle.

A restricted mode means, for example, that in such a mode, the motor vehicle may be guided at a lower maximum motor vehicle velocity than in the nonrestricted mode.

What is claimed is:

1. A method for testing a sensor system of a motor vehicle, the sensor system including a surroundings sensor which is configured to detect surroundings of the motor vehicle, the method comprising the following steps:

receiving reference object signals, which represent a reference object detected, using a motor vehicle-external surroundings sensor, in the surroundings of the motor vehicle;

receiving object signals, which represent an object detected using the surroundings sensor, in the surroundings of the motor vehicle; and comparing the object to the reference object to test the sensor system, wherein, after both the reference object signals and also the object signals have been received, a point in time for the comparison of the object to the reference object is ascertained based on a processing capacity available for the comparing step, the comparing step comparing the object to the reference object being carried out at the ascertained point in time.

2. The method as recited in claim 1, wherein the reference object is described by at least one reference object parameter and the object is described by at least one object parameter, the comparison of the object to the reference object including a comparison of the at least one reference object parameter to the at least one object parameter.

3. The method as recited in claim 2, wherein the at least one reference object parameter and the at least one object parameter are each an element selected from the following group of parameters: position, dimension, color, surface condition, velocity, acceleration, classification.

4. The method as recited in claim 1, wherein reference time stamp signals are received which represent a reference time stamp which indicates a detection point in time of the reference object, time stamp signals are received which represent a time stamp which indicates a detection point in time of the object, the comparison of the object to the reference object including a comparison of the time stamp to the reference time stamp.

5. The method as recited in claim 1, wherein based on the comparison of the object to the reference object, control signals for at least semi-automated control of a lateral and/or longitudinal guidance of the motor vehicle are generated, the generated control signals being output.

6. The method as recited in claim 1, wherein one or multiple method steps are executed internally in the motor vehicle and/or externally from the motor vehicle in a cloud infrastructure.

7. The method as recited in claim 1, wherein one or multiple method steps are documented in a block chain.

8. The method as recited in claim 1, wherein the reference object signals are included by a unicast communication message intended for the motor vehicle or by a broadcast communication message.

9. A device configured to test a sensor system of a motor vehicle, the sensor system including a surroundings sensor which is configured to detect surroundings of the motor vehicle, the device configured to:

receive reference object signals, which represent a reference object detected, using a motor vehicle-external surroundings sensor, in the surroundings of the motor vehicle;

receive object signals, which represent an object detected using the surroundings sensor, in the surroundings of the motor vehicle; and compare the object to the reference object to test the sensor system, wherein, after both the reference object signals and also the object signals have been received, a point in time for the comparison of the object to the reference object is ascertained based on a processing capacity available for the comparing step, the comparing step comparing the object to the reference object being carried out at the ascertained point in time.

10. A non-transitory machine-readable storage medium on which is stored a computer program for testing a sensor system of a motor vehicle, the sensor system including a surroundings sensor which is configured to detect surroundings of the motor vehicle, the computer program, when executed by a computer, causing the following steps:

receiving reference object signals, which represent a reference object detected, using a motor vehicle-external surroundings sensor, in the surroundings of the motor vehicle;

receiving object signals, which represent an object detected using the surroundings sensor, in the surroundings of the motor vehicle; and comparing the object to the reference object to test the sensor system, wherein, after both the reference object signals and also the object signals have been received, a point in time for the comparison of the object to the reference object is ascertained based on a processing capacity available for the comparing step, the comparing step comparing the object to the reference object being carried out at the ascertained point in time.

* * * * *